(12) United States Patent
Ladret et al.

(10) Patent No.: US 8,947,011 B2
(45) Date of Patent: Feb. 3, 2015

(54) CIRCUIT FOR RETRO-LIGHTING A DISPLAY

(75) Inventors: Daniel Ladret, Lans en Vercors (FR); Nawel Bouredji, La Fontanil (FR)

(73) Assignee: St-Ericsson SA, Plan-les-Ouates (CH)

( * ) Notice: Subject to any disclaimer, the term of this patent is extended or adjusted under 35 U.S.C. 154(b) by 93 days.

(21) Appl. No.: 13/808,913

(22) PCT Filed: Jul. 22, 2011

(86) PCT No.: PCT/EP2011/062691
§ 371 (c)(1),
(2), (4) Date: May 28, 2013

(87) PCT Pub. No.: WO2012/010707
PCT Pub. Date: Jan. 26, 2012

(65) Prior Publication Data
US 2013/0234592 A1    Sep. 12, 2013

Related U.S. Application Data

(60) Provisional application No. 61/387,655, filed on Sep. 29, 2010.

(30) Foreign Application Priority Data

Jul. 23, 2010  (EP) .................................... 10305821

(51) Int. Cl.
H05B 37/02  (2006.01)
H05B 33/08  (2006.01)
H02M 3/07  (2006.01)

(52) U.S. Cl.
CPC .......... H05B 33/083 (2013.01); H05B 33/0815 (2013.01); H02M 2003/071 (2013.01)

USPC ............................ 315/291; 315/224; 315/307

(58) Field of Classification Search
USPC ............................ 315/209 R, 224, 291, 307
See application file for complete search history.

(56) References Cited

U.S. PATENT DOCUMENTS

| 4,809,152 A | 2/1989 | Bingham et al. |
| 6,348,818 B1 | 2/2002 | Filipovski |
| 8,492,998 B2 * | 7/2013 | Hwang et al. ................. 315/297 |
| 2007/0001625 A1 | 1/2007 | Kim |
| 2007/0146050 A1 | 6/2007 | Chen et al. |
| 2008/0094042 A1 | 4/2008 | Ferrario |
| 2008/0129225 A1 | 6/2008 | Yamamoto et al. |
| 2011/0204797 A1* | 8/2011 | Lin et al. ....................... 315/161 |

FOREIGN PATENT DOCUMENTS

EP    2 043 243 A1    4/2009

OTHER PUBLICATIONS

European Search Report issued in corresponding European application No. 10 30 5821, completion date Nov. 25, 2010.
International Search Report issued in corresponding International application No. PCT/EP2011/062691, mailing date Oct. 6, 2011.

* cited by examiner

Primary Examiner — Jimmy Vu
(74) Attorney, Agent, or Firm — Patent Portfolio Builders PLLC

(57) ABSTRACT

There is described a circuit for retro-lighting a display, comprising a group of white light-emitting diodes connected in series between a first node and a second node and a circuit for driving said group of series-coupled light-emitting diodes comprising: a power supply providing a positive voltage supplied to the first node; and a charge pump converter providing a negative voltage obtained from the positive voltage, said negative voltage being supplied to the second node.

7 Claims, 2 Drawing Sheets

CIRCUIT FOR RETRO-LIGHTING A DISPLAY

TECHNICAL FIELD

The present invention generally relates to circuits for retro-lighting a display. It finds application, in particular, in mobile devices such as mobile phones, smart phones, personal digital assistants (PDAs), MP3 players, etc.

RELATED ART

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Displays for mobile devices mainly make use of the LCD ("Liquid Crystal Display") technology. LCD need to be retro-lighted.

In mobile devices, the bulb which is necessary for such retro-lighting is generally provided by a group of white LEDs ("Light Emitting Diodes") connected in series and sometimes in parallel.

The number of LEDs necessary for retro-lighting the display increases as the screen size increases.

Generally, the series topology of the LEDs is preferred because this topology enables to have the same current flowing through the LEDs, and thus provides a better homogeneity of the LEDs' light.

Classically, a LED has a classical breakdown voltage around 2.8V-3.0V. Thus, when the number of LEDs needed to retro-light the display is around 10 LEDs, the voltage to supply the series of LEDs must be higher than 28V-30V.

Nowadays, the current technology is able to sustain only a voltage of 20V so that it is not possible to design a series of white LEDs integrating more than 6 LEDs.

SUMMARY OF THE INVENTION

To address the above needs, a first aspect of the present invention relates to a circuit for retro-lighting a display, comprising a group of white light-emitting diodes connected in series between a first node and a second node, and a circuit for driving said group of series-coupled light-emitting diodes comprising:
- a power supply providing a positive voltage supplied to the first node; and,
- a charge pump converter providing a negative voltage obtained from the positive voltage, said negative voltage being supplied to the second node.

With the circuit according to the present invention, it is possible to drive a larger number of LEDs connected in series.

In one embodiment of the present invention, the charge pump converter comprises:
- a charge pump capacitor having a first terminal coupled to the first node through a first resistor and a second terminal coupled to the second node and to a ground terminal through a free-wheel diode having an anode and a cathode, said anode being coupled to the second node and said cathode being coupled to the ground terminal; and,
- a switching element connected between the first terminal of the charge pump capacitor and the ground terminal, and controlled to regulate the voltage across the charge pump capacitor based on the desired value for the negative voltage.

These features enable to adjust the negative voltage supplied to the LEDs depending on their number.

A second aspect of the present invention relates to a display comprising the circuit of the first aspect of the invention.

Such display is suitable to have an increased screen size since the number of LEDs may be larger than for existing displays.

A third aspect of the present invention relates to a mobile device comprising the display of the second aspect as defined above.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF PREFERRED EMBODIMENTS

Figure 1:
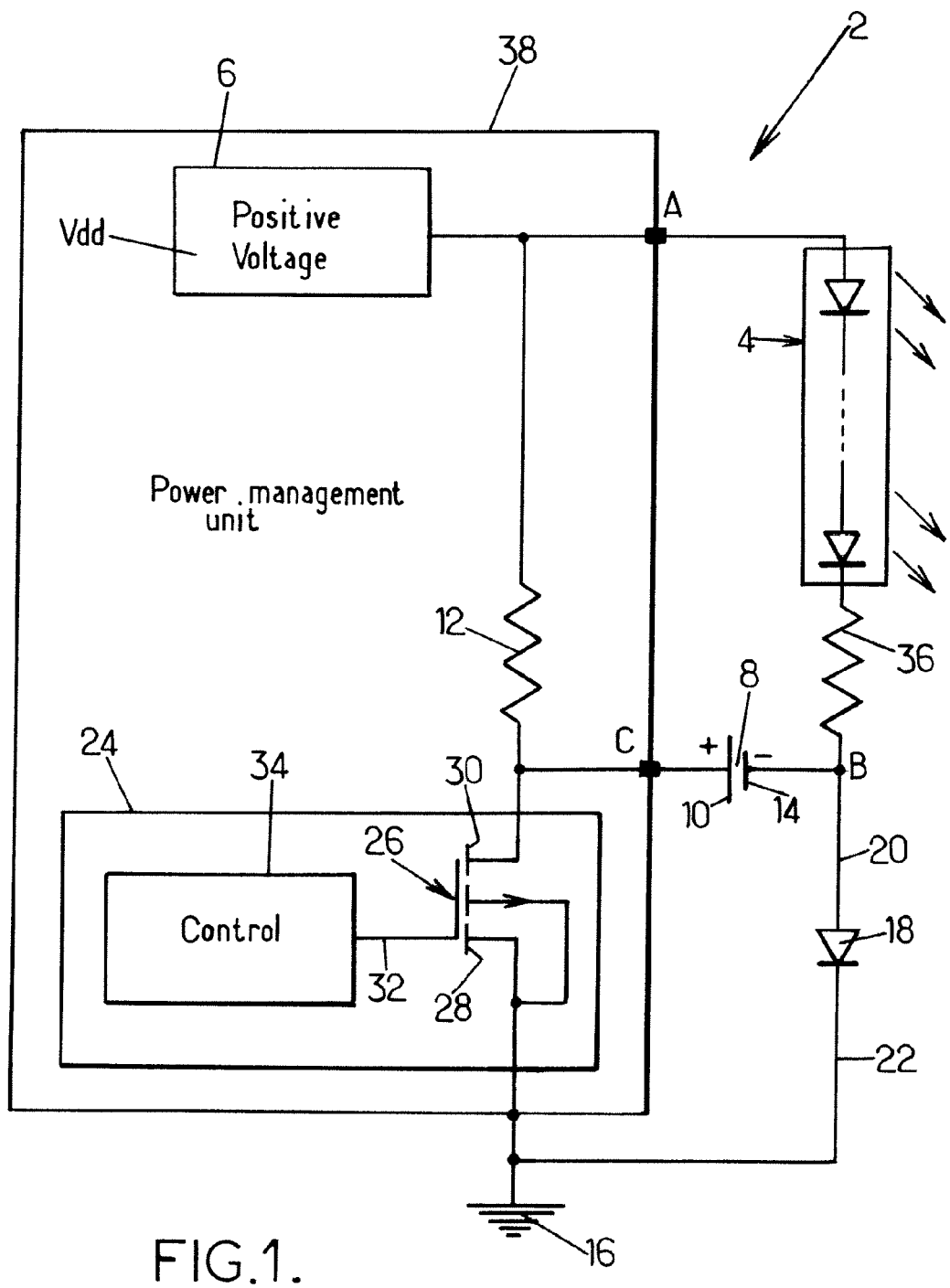
FIG. 1 is a schematic view of an embodiment of the circuit for retro-lighting a display.

Referring to FIG. 1, there is shown therein a schematic view of a circuit 2 for retro-lighting a display.

The circuit 2 comprises a group 4 of white light-emitting diodes (LEDs) connected in series between a first node A and a second node B.

The circuit 2 also comprises a circuit for driving the group of LEDs. This driving circuit comprises a power supply 6 providing a positive voltage supplied to the first node A and a charge pump converter providing a negative voltage supplied to the second node B, obtained from the DC/DC conversion of the positive voltage.

The positive voltage provided by the power supply 6 is, for example, issued from a DC/DC converter obtaining the positive voltage from a power supply voltage Vdd of the circuit 2.

The output voltage of the DC/DC converter is function of the number of LEDs to be driven.

A typical average value of the current supplied by the power supply 6 is around 50 mA, but there may be some transient up to 150 mA.

Advantageously, the power supply 6 may have a slow voltage variation to operate a dimming on the white LEDs.

The charge pump converter comprises a charge pump capacitor 8 having a first terminal 10 coupled to the first node A through a first resistor 12 and a second terminal 14 coupled to the second node B. The second terminal 14 of capacitor 8 is coupled to a ground terminal 16 through a free-wheel diode 18. Diode 18 has an anode 20 and a cathode 22, said anode 20 being coupled to the second node B and said cathode 22 being coupled to the ground terminal 16.

The charge pump converter also comprises a switching element 24 connected between the first terminal 10 of the charge pump capacitor 8 (node C) and the ground terminal 16 and controlled to regulate the voltage across the charge pump capacitor 8 depending on the desired value for the negative voltage.

The charge pump capacitor 8 may be chosen as a 10 µF ceramic capacitor. However this capacitance value can be decreased depending on a predefined switching frequency of the display. For instance, a value of 1 μF may be used.

The resistor 12 enables to limit the current in the circuit, and thus the voltage across the capacitor 8. For example, resistor 12 insures a voltage $V_C$ across the switching element 24 of 15V when the switching element 24 is open and a voltage $V_C$ of 0V when the switching element 24 is closed. The precision of this resistor 12 is not mandatory.

The free wheel diode 18 insures that the charge pump capacitor 8 is running between around 0V and the negative voltage, for example −15 V.

According to an embodiment of the present invention, the switching element 24 comprises a MOS transistor 26 having a first main terminal 28 coupled to the ground terminal 16, a second main terminal 30 coupled to the first terminal 10 of the charge pump capacitor 8, and a gate terminal 32.

The MOS transistor 26 is, for example, a NMOS transistor, of which the first main terminal 28 is the source terminal and the second main terminal 30 is the drain terminal.

The switching element 24 also comprises a control circuit 34 having a control output coupled to the gate terminal 32 of the MOS transistor 26, and configured for controlling the current through the MOS transistor 26.

The control circuit 34 provides a control voltage for the switch 24 at the predefined switching frequency which is generally chosen higher than 50 Hz so as to avoid visual problems at the display.

Furthermore, the control circuit 34 is able to decrease the amplitude of the output control signal in order to put the MOS transistor 26 in a region of higher resistance. In this case, the current through the MOS transistor 26 is decreased and the charge pump capacitor 8 is charged at a lower voltage i.e. the voltage $V_B$ is closer to 0V. This feature of the control circuit allows making a dimming on the white LEDs.

Advantageously, the circuit 2 also comprises a second resistor 36 connected in series between the group 4 of series-coupled light-emitting diodes and the second terminal 14 of the charge pump capacitor 8.

This second resistor 36 permits to limit the current through the white LEDs.

According to the embodiment as shown in FIG. 1, the power supply 6, the switching element 24 and the first resistor 12 may be integrated in a power management unit 38.

In one example wherein the positive voltage supplied by the power supply 6 is 15V, the circuit 2 of the invention operates as follows, with reference to FIGS. 2 and 3.

Figure 2:
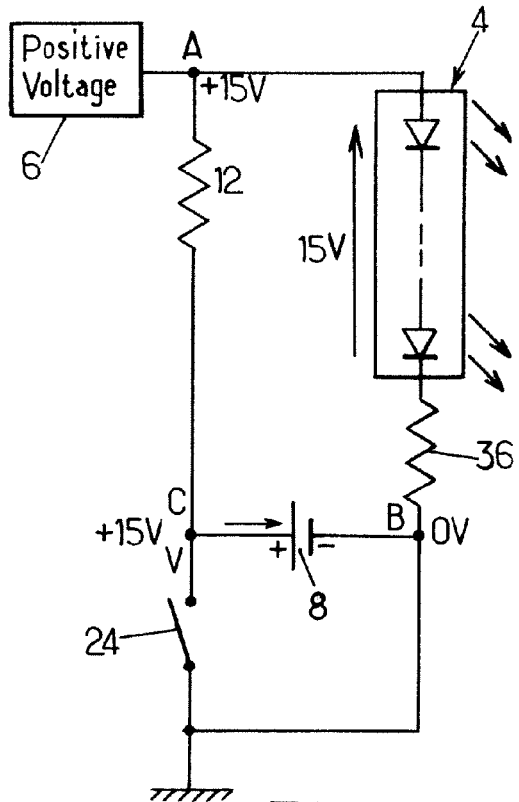
FIG. 2 is a schematic view of a first state of the circuit of FIG. 1.

When the switching element 24 is open, as shown in FIG. 2, the voltages at nodes A, B, C are $V_A$ ~15V, $V_B$ ~0V, and $V_C$ ~15V, respectively. Thus the voltage supplied to the group 4 of LEDs is $V_{AB}$ ~15V that is to say under the sum of the threshold voltages of LEDs, and therefore the LEDs do not emit light. Capacitor 8 is charging under a voltage of ~15 V.

Figure 3:
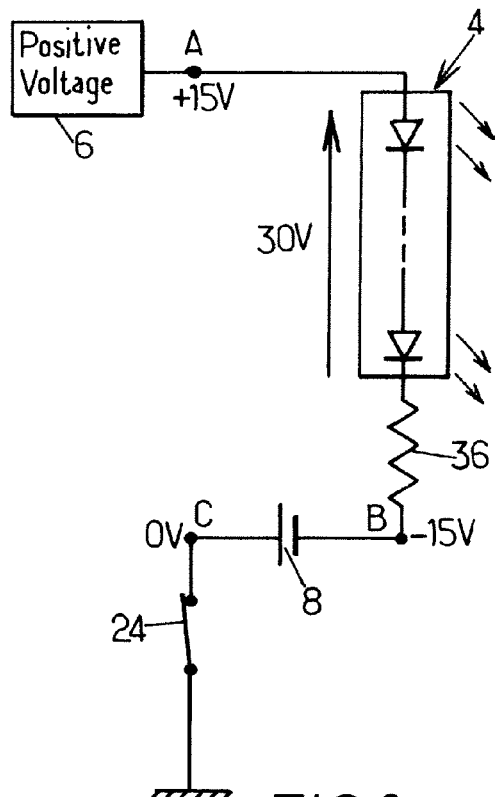
FIG. 3 is a schematic view of a second state of the circuit of FIG. 1, and, FIG. 4 is a schematic view of an embodiment of a mobile device.

When the switching element 24 is closed, as shown in FIG. 3, the voltages at nodes A, B, C are $V_A$ ~15V, $V_B$ ~15V, and $V_C$ ~0V, respectively. Thus the voltage supplied to the group 4 of LEDs is $V_{AB}$ ~30V that is to say above the sum of the threshold voltages of LEDs and the LEDs emit light.

Using LEDs with a breakdown voltage of 2.8-3V, the number of LEDs in series may thus be as high as 10. Of course, the principle of the invention is not limited to this example.

Figure 4:
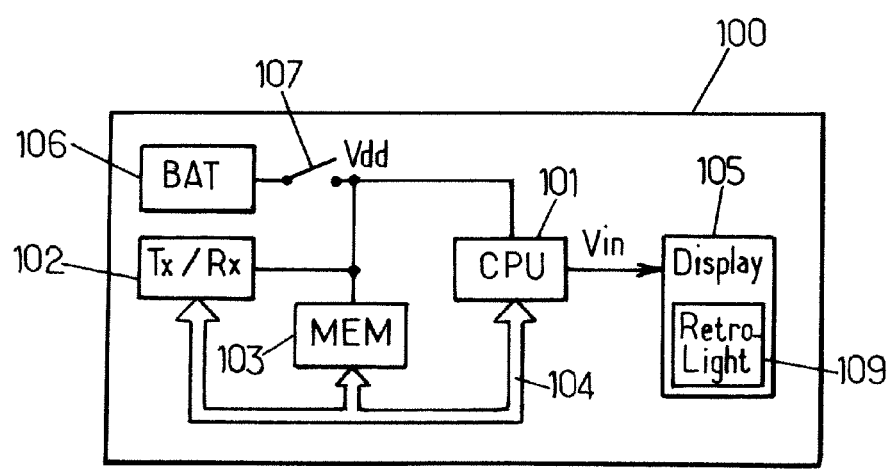

The block diagram in FIG. 4 shows the elements of a device incorporating a display as presented above. Such a device can be a mobile telephone or any other telephone, or any other device for communication.

The device 100 comprises a control unit 101 such as a processor (CPU), and a communication unit 102 for sending and receiving information from the outside, in particular by modulating a radio frequency carrier. It also comprises a memory 103 which can store information in digital form, for example a piece of video. The processor 101 communicates with the unit 102 and the memory 103 via a communication bus 104. Each of these elements is powered by the supply voltage Vdd delivered by a battery 106 through a control switch 107.

At power-on, this switch 107 is closed. The processor 101 generates a signal Vin to be displayed, either from data received via the unit 102, or from data read from the memory 103. To display this signal Vin, the device 100 comprises a display 105 comprising a circuit 109 for retro-lighting said display whose embodiments have been described above. This display is also powered by the voltage Vdd supplied to it through the switch 107 once power is turned on.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A circuit for retro-lighting a display, comprising a group of white light-emitting diodes connected in series between a first node and a second node and a circuit for driving said group of series-coupled light-emitting diodes comprising:
a power supply providing a positive voltage supplied to the first node; and
a charge pump converter providing a negative voltage obtained from the positive voltage, said negative voltage being supplied to the second node,
wherein the charge pump converter comprises:
a charge pump capacitor having a first terminal coupled to the first node through a first resistor and a second terminal coupled to the second node and to a ground terminal through a free-wheel diode having an anode and a cathode, said anode being coupled to the second node and said cathode being coupled to the ground terminal; and
a switching element connected between the first terminal of the charge pump capacitor and the ground terminal, and controlled to regulate the voltage across the charge pump capacitor based on the desired value for the negative voltage.

2. The circuit according to claim 1, wherein the power supply providing the positive voltage comprises a DC/DC converter for obtaining the positive voltage from a power supply voltage of the circuit.

3. The circuit according to claim 1, wherein the switching element comprises a MOS transistor having a first main terminal coupled to the ground terminal, a second main terminal coupled to the first terminal of the charge pump capacitor, and a gate terminal; and a control circuit having a control output coupled to the gate terminal of the MOS transistor, and configured for controlling the current through the MOS transistor.

4. The circuit according to claim 1, further comprising a second resistor connected in series between the group of series-coupled light-emitting diodes and the second terminal of the charge pump capacitor.

5. The circuit according to claim 1, further comprising a power management unit, wherein the power management unit comprises the power supply, the switching element and the first resistor.

6. A display, comprising the circuit for retro-lighting said display according to claim 1.

7. A mobile device comprising the display according to claim 6.

* * * * *